United States Patent [19]

Kush, Jr. et al.

[11] 3,723,951
[45] Mar. 27, 1973

[54] ACOUSTICAL DETECTOR CIRCUIT

[75] Inventors: Louis J. Kush, Jr.; Walter L. Baker, both of State College, Pa.

[73] Assignee: The United States of America as represented by the Secretary of the Navy

[22] Filed: June 5, 1963

[21] Appl. No.: 286,149

[52] U.S. Cl.....................340/3 R, 340/5 R, 340/6 R
[51] Int. Cl...............................................G01s 9/66
[58] Field of Search............340/3, 5, 6, 15, 15.5, 261,
340/16, 3 FM, 3 D; 181/.52, .53; 328/31, 32,
33, 140; 324/18, 77; 329/134, 126–128;
307/88.5; 179/1 AS; 114/23

[56] References Cited

UNITED STATES PATENTS

| | | | |
|---|---|---|---|
| 2,720,584 | 10/1955 | Sloughter | 329/134 X |
| 2,978,673 | 4/1961 | Graham | 340/15.5 |
| 2,987,674 | 6/1961 | Shain | 324/78 |
| 2,995,100 | 8/1961 | Edwards | 340/6 X |
| 3,126,490 | 3/1964 | Stern | 307/88.5 |
| 3,131,315 | 4/1964 | Morwald | 307/88.5 |

*Primary Examiner*—Richard A. Farley
*Attorney*—Q. B. Warner and V. C. Muller

EXEMPLARY CLAIM

2. An apparatus for use in underwater active-acoustic echo-ranging systems to provide a measure of the variable ratio of self-noise to reverberation signals during listening intervals between successive search-pulse transmission instants, said apparatus comprising, in combination:

hydrophone means for reception of target-echo signals in a background of reverberation and self-noise signals;

a limiter circuit for conversion of said signals to a rectangular-waveform signal having the same zero-axis crossing characteristics as the signal received by said hydrophone means;

multi-vibrator means adapted to provide, in response to triggering action of said rectangular-waveform signal whenever it changes polarity in preselected sense, a train of short pulses of fixed duration and amplitude;

said train of pulses presenting a frequency-variational characteristic evidenced by an A.C. ripple signal which in a predetermined frequency band is of magnitude increasing with self-noise/reverberation signal ratio;

means including a band-pass filter for passing only said predetermined frequency band of A.C. ripple signal; and means responsive to said A.C. ripple signal in said predetermined frequency band to provide a measure of said self-noise/reverberation signal ratio.

2 Claims, 5 Drawing Figures

Patented March 27, 1973 3,723,951

LOUIS J. KUSH, JR.
WALTER L. BAKER
  INVENTOR.

BY

*V. C. Muller*
ATTORNEY

LOUIS J. KUSH, JR.
WALTER L. BAKER
INVENTOR.

BY
ATTORNEY

ACOUSTICAL DETECTOR CIRCUIT

This invention relates to noise detector circuits and in particular to a detector circuit capable of determining the characteristics and quality of entrant acoustical vibrations.

In the acoustic art, it is sometimes necessary to know the characteristics of various acoustical vibrations so that they may be more accurately processed to gain other information. This is particularly true in the acoustic art as related to underwater sound applied to acoustic homing torpedoes. Such torpedoes are equipped with acoustic detection devices or hydrophones and electronic circuits to process acoustic signals reaching the hydrophone from its aquatic environment. For example, such a torpedo may detect acoustic vibrations emitted by an enemy vessel, process these so as to "home upon" the vessel, hit it, and destroy the enemy craft. This type of device is known as a "passive" acoustic torpedo. Other homing torpedoes utilizing an "active" acoustic system will emit an acoustic pulse which will echo from the enemy craft, be detected by the hydrophones on the torpedo, and by processing of this echo signal will "home upon" the enemy craft hitting and destroying it.

In the use of acoustic homing torpedoes, the acoustic vibrations reaching the hydrophones are generally of three types: the noise made by the torpedo itself or self-noise, reverberation generated from the acoustic pulse emitted by the torpedo, and echoes from the target or other objects. A much more efficient detection and guidance signal can be used in these torpedoes if it is possible to determine the nature of the sound detected by the hydrophones as to self-noise, reverberation, or echoes, and the relative amplitude of each present. Thus an acoustic signal processing circuit particularly suitable for detection of echoes in a self-noise background might be utilized if it were known that the signal detected by the hydrophone was, for example, mostly self-noise rather than reverberation. It is the purpose of this invention, therefore, to provide an electronic circuit whereby the quality and quantity of incoming acoustic vibrations may be instantaneously and accurately determined. This information may then be used to actuate an appropriate gating circuit to direct the processing of these vibrations to the most efficient guidance system within the torpedo.

This invention accomplishes this result by detecting and measuring the variational characteristics of the zero-axis crossings of the acoustic vibrations reaching the hydrophones, and identifying these characteristics as related to noise, reverberation, or echoes. It has been discovered that a definite relationship exists between such variational characteristics of the zero-axis crossings and the nature of the acoustic vibrations. Thus, this invention in effect measures the rate of change or variational characteristics of the zero-axis crossings, the magnitude of this variational characteristic being dependent upon the nature of the input acoustic signal.

This result is accomplished by a circuit comprising a hydrophone for the detection of acoustical vibration, a hard-limiter circuit, and a monostable multi-vibrator circuit which converts say the positive-going zero-axis crossing of the resultant limited signal into a short pulse of finite amplitude. The output from the multi-vibrator circuit is then filtered and its variational characteristic (A.C. ripple) is converted into a direct current voltage output which can be read upon a conventional voltmeter or other measuring instrumentation. The direct current voltage output is dependent upon the character of the signal received by the hydrophone. Thus, by a simple voltmeter reading interpolated through curves, the nature and relative amplitude of the acoustic vibrations reaching the hydrophone can be determined.

It is thus the object of this invention to provide a new and improved noise detector circuit which will indicate qualitatively and quantatively the nature of acoustic input signals as to noise, reverberation, and echoes.

It is another object of this invention to provide a new noise detector based on the variational characteristics of the zero-axis crossings of acoustical vibrations at the input.

Further objects and advantages of this invention will become apparent from the examination of the following description and claims forming a part of this specification.

For better understanding of the invention together with other and further objects thereof, reference is now made to the following detailed description which is to be read in conjunction with the accompanying drawings in which.

Figure 2:
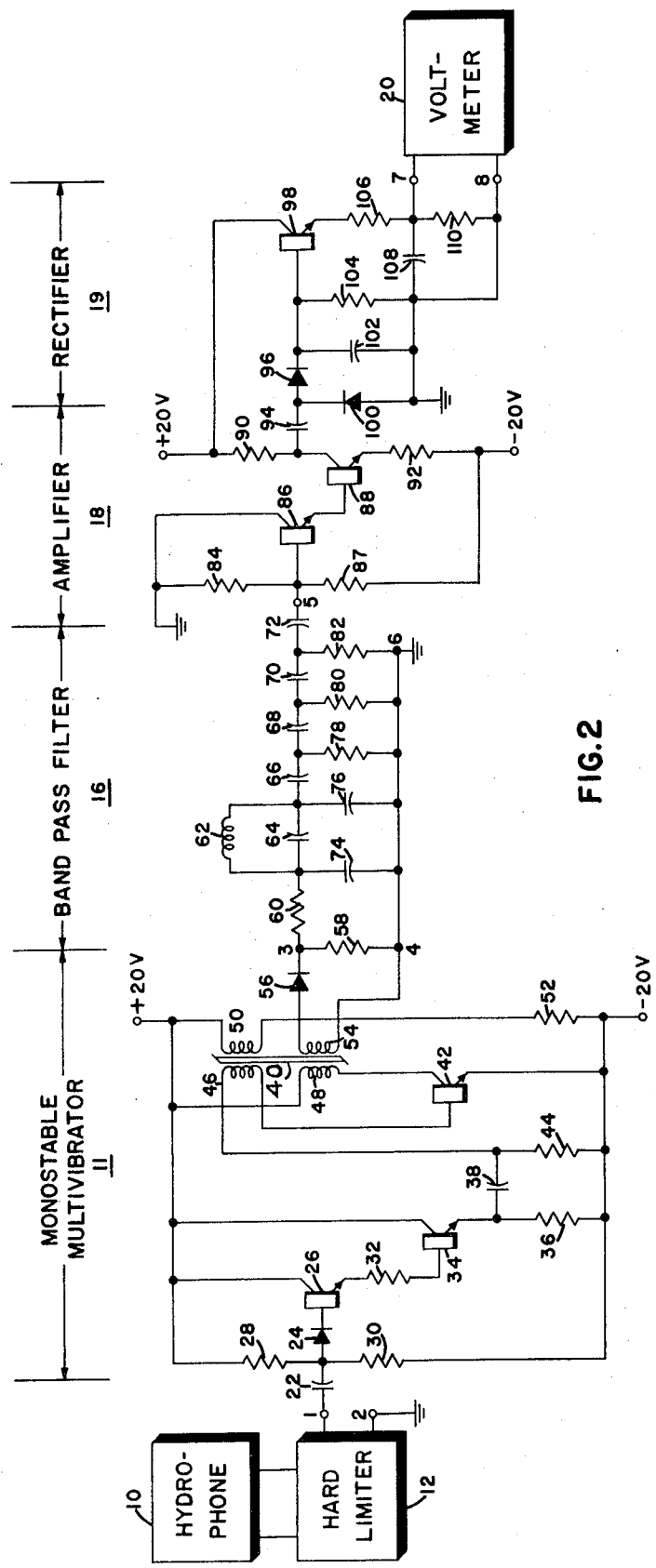
FIG. 2 is a schematic drawing of the circuit represented in FIG. 1.
Figure 1:
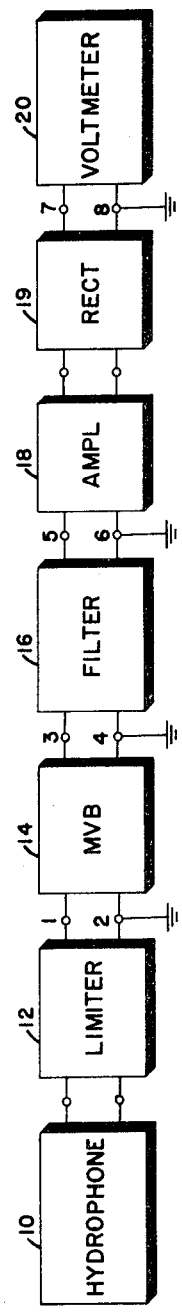
FIG. 1 shows a block diagram of a noise detector circuit illustrating the preferred embodiment of this invention.

Referring now to the drawing and in particular to FIG.'s 1 and 2, the preferred embodiment of the invention is comprised of the following elements connected to the next succeeding one in series. Hydrophone 10 is connected to a hard-limiter circuit 12, the output of which is coupled to a monostable multi-vibrator circuit 14. The output from the multi-vibrator circuit then is fed through a bandpass filter 16 whose output passes through an amplifier circuit 18 and a rectifier circuit 19, and from there to a voltmeter 20 from which a reading may be taken indicating the nature of acoustic vibration received by the hydrophone. When this preferred embodiment is used in an acoustic homing torpedo, as previously suggested, a gating circuit (not shown) may be substituted for voltmeter 20 which will direct the signals from the hydrophone into a particular electronic circuit designed to most efficiently process signals of the nature being received.

Hydrophone 10 may be one of any number of sound detection or microphone devices which converts impinging acoustical vibration into alternating current signals. Limiter 12 can be any one of a number of conventional electronic circuits commonly referred to as "hard" limiters which in effect imposes a squaring action upon the signal applied thereto. The monostable multi-vibrator circuit 14 is one of the number of circuits referred to as frequency counters. In this preferred embodiment the multi-vibrator 14 produces a short pulse of finite amplitude and duration each time the limiter 12 output signal goes from say negative to positive. Filter 16 (detailed in FIG. 2) is of a type which passes only a preselected frequency band of the variational characteristic (A.C. ripple) of the multi-vibrator output signal, and the A.C. ripple is raised to suitable level by amplifier 18, converted to a D.C. voltage by rectifier 19, and indicated by voltmeter 20.

Thus in operation an acoustic vibration will be detected by hydrophone 10, be processed in the above-mentioned manner, and appear at voltmeter 20 as a specific voltage. In the alternative, voltmeter 20 may be replaced by a gating device, as previously mentioned, which will automatically switch the signals from the hydrophone 10 to the particular circuit within the torpedo most capable and efficient of processing them to direct the torpedo most accurately toward its target.

Referring now to FIG. 2, the acoustic vibration received by hydrophone 10 is converted to alternating current pulses and fed into limiter 12 which as previously mentioned is comprised of a conventional electronic circuit which will emit a positive voltage when the incoming signal from hydrophone 10 is positive and negative pulse of finite duration each time this signal goes negative. Regardless of the input level the absolute value of the output is the same. The output of the limiter is connected to terminal 1 of monostable multivibrator 14 and to grounded terminal 2. Terminal 1 is connected through coupling capacitor 22 through diode 24 to the base of transistor 26 which serves as the basis of an isolation circuit. Diode 24 is so oriented that it will permit only positive electrical pulses to reach the base of transistor 26 and will block negative signals. The anode of diode 24 is connected through resistor 28 to a source of +20 volts and through resistor 30 to a source of −20 volts. These power sources serves as driving power for the transistor 26. The emitter of transistor 26 is coupled through resistor 32 to the base of transistor 34 which operates as an impedance matching device. The collector of transistor 34 is connected to the source of +20 volts, and the emitter through resistor 36 connected to the source of −20 volts. The emitter of transistor 34 is then coupled through coupling capacitor 38 through the primary coil 46 of transformer 40 to the base of transistor 42. Transformer 40 and transistor 42 together comprise a blocking oscillator with a saturable core which produce at their output, pulses of fixed duration and amplitude, equivalent height and width. When plotted vs time, these pulses have equal energy area.

The primary coil 46 is also connected through resistor 44 to the source of −20 volts. The collector terminal of transistor 42 is coupled through primary coil 48 of transformer 40 to the source of +20 volts while the emitter terminal of transistor 42 is connected directly to the source of −20 volts. Secondary coil 50 of transformer 40 is connected from the source of +20 volts through resistor 52 to the source of −20 volts. Secondary coil 54 is connected through diode 56 to terminal 3, the output terminal of the multi-vibrator 14. Terminal 4 is connected to the opposite end of secondary coil 54 and is grounded. The output of the multivibrator appears across terminals 3 and 4 which are connected through resistor 58. Thus transformer 40 is comprised of two primary and two secondary coils and has a common core. Diode 56 is so oriented that only positive pulses of signal output from multi-vibrator 14 will pass.

Terminals 3 and 4 of the output of multi-vibrator 14 are then connected to bandpass filter 16, which in this embodiment has a lower cutoff frequency of approximately 100 cps and an upper cutoff frequency of 500 cps. Terminal 4 serves as a grounded return for all elements of the bandpass filter 16. Terminal 3 is connected through resistor 60, parallel connection of capacitor 64 and inductor 62, through series connected capacitors 66, 68, 70, and 72 to terminal 5, the output of bandpass filter 16. The output of resistor 60 is grounded through capacitor 74; the output of parallel connected capacitor 62 and inductor 64 is grounded through capacitor 76. The output of capacitor 66 is likewise grounded through resistor 78; the output of capacitor 68 grounded through resistor 80 and the output of capacitor 70 grounded through resistor 82.

Output terminal 5 of bandpass filter 16 is connected to ground through resistor 84 and to the base of transistor 86 which serves as the basis of an emitter follower for impedance matching purposes. This device is frequently referred to as a modified Darlington circuit. Terminal 5 is connected through resistor 87 to the source of −20 volts which serves as a power source for transistor 86. The collector terminal of transistor 86 is grounded and the emitter terminal coupled to the base of transistor 88, which acts as a voltage amplifier. The collector terminal of transistor 88 is then coupled through resistor 90 through the source of +20 volts and the emitter terminal through resistor 92 to the source of −20 volts. The collector terminal of transistor 88 is then coupled through coupling capacitor 94 and diode 96 to the base of transistor 98 which acts as an emitter follower for the amplifier 18 and rectifier 19. Diode 96 is so oriented that only positive signal pulses will pass. The output from coupling capacitor 94 is also connected through diode 100 to ground. Diode 100 is oriented in that its anode is grounded. Thus, it grounds all negative components of signal. The base of transistor 98 is coupled through parallel connected capacitor 102 and resistor 104 to ground and the collected connected to the source of +20 volts. The emitter terminal of transistor 98 is connected through resistor 106 to terminal 7, the output of amplifier 18 and rectifier 19. Terminal 7 is also connected to ground through parallel connecting capacitor 108 and resistor 110. Terminal 8, the output terminal of amplifier 18 and rectifier 19, is grounded. Terminals 7 and 8 are then connected to voltmeter 20, or as previously mentioned, when used in a torpedo, to gating devices which will switch the output of hydrophone 10 through appropriate guidance circuits.

For application to an active acoustic torpedo, the echo and torpedo self-noise frequency are heterodyned to between 1500 and 2500 cycles per second; the reverberation is approximately 30 cycles per second wide and by AFC action is centered at about 2000 cycles per second frequency. Concerning the monostable multi-vibrator output signal, the average spectrum level for each bandwidth may be computed by dividing the output voltage in that bandwidth by the square root of the bandwidth. The output spectra of both reverberation and torpedo self-noise are approximately "white" over the frequency band between 1 and 1000 cycles per second, but the output level for the noise is greater than that for reverberation. The output for pure tone input is obviously zero between 1 and 1000 cycles per second since the interval between zero-axis crossings is a constant. The multi-vibrator 14 has a pulse duration of approximately 100 microseconds.

In order to eliminate a DC output from the multi-vibrator 14, as well as the AC above 1500 cycles per second, a bandpass filter 16 is used. This bandpass filter 16 has lower and upper cutoff frequencies of approximately 100 and 500 cycles per second and attenuation of approximately 24 db per octave outside of the bandpass. The alternating current amplifier 18 and rectifier 19 raises the AC level of the output from the bandpass filter 16 and rectifies this output to a direct current signal, which is fed to voltmeter 20 or other electronic gating devices in the torpedo previously mentioned. In this application, the amplifier 18 connected to rectifier 19 is a modified Darlington type circuit. An emitter follower couples the direct current output of the rectifier to the voltmeter 20 through a smoothing network comprising resistors 106 and 110 and capacitor 108.

Figure 3:
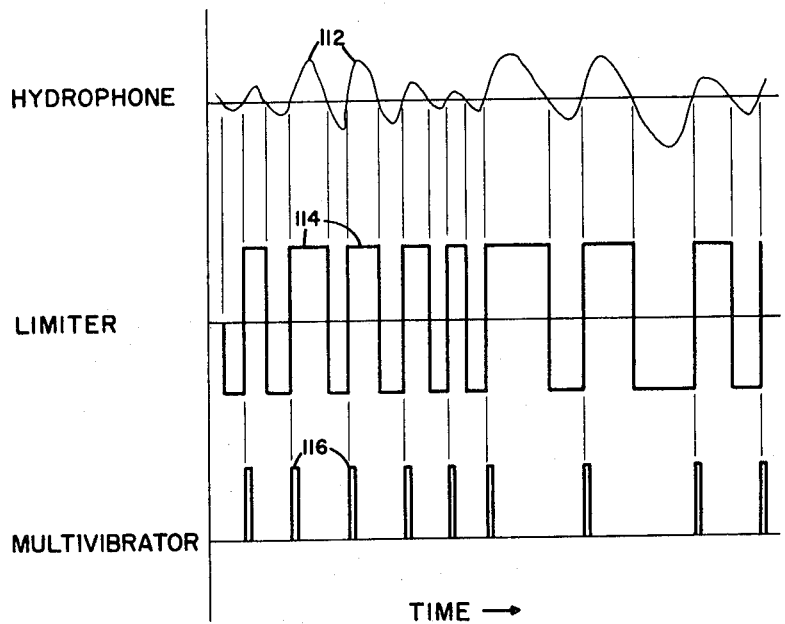
FIG. 3 is a graphical representation of the signal output in volts vs time for the hydrophone, limiter, and monostable multi-vibrator.

The operation of this embodiment may be seen with reference to FIGS. 2 and 3. Acoustic vibration from the aquatic environment is received by hydrophone 10 and converted to alternating current signals 112 and fed into limiter 12 which emits signal 114 consisting of positive and negative pulses when the incoming signal goes from negative-to-positive and from positive-to-negative. These pulses are of equal amplitude, and may be described as rectangular. The rectangular pulses pass through condenser 22 to diode 24 which presents very high impedance to negative pulses but allows the positive ones to pass through to the base of transistor 26. Transistor 26 and coupled transistor 34 act similarly to current amplifiers increasing the current of each positive pulse. The pulse signal then passes through condenser 38 through primary coil 46 to transistor 42. The current surge of each positive pulse to primary coil 46 will by induction produce a positive surge through primary coil 48 causing an extreme current surge through the emitter of transistor 42. However, as this surge increases, the core of transformer 40 becomes saturated automatically cutting off the current surge through transistor 42. This current surge is by induction transmitted to the secondary coil 54 to diode 56 which eliminates any negative components. Thus the signal 116 leaving the monostable multi-vibrator 14 is a sharp spike or peak.

Bandpass filter 16 operates in the conventional manner to limit the frequency of the spiked output from monostable multi-vibrator 14 to the frequencies between 100 and 500 cycles per second. These bandpass frequencies of spiked signals 116 then pass through transistors 86 and 88 which effectively act as voltage amplifiers increasing the power of the signals. The spiked signal 116 then passes through condenser 94 to diode 96 which eliminates any negative component of the signal while diode 100 shorts to ground any remaining negative signal components. Capacitor 102 and resistor 104 then act as a smoothing filter and transistor 98 as a voltage emitter follower which transmits signals for additional smoothing to the filter comprised of capacitor 108 and resistor 110. The signal thus arriving at terminal 7 and 8 is essentially a direct current voltage signal which may be measured on voltmeter 20. This direct current voltage signal of course fluctuates and increases as the variation in frequency of zero-axis crossing increases and decreases as it decreases.

Figure 4:
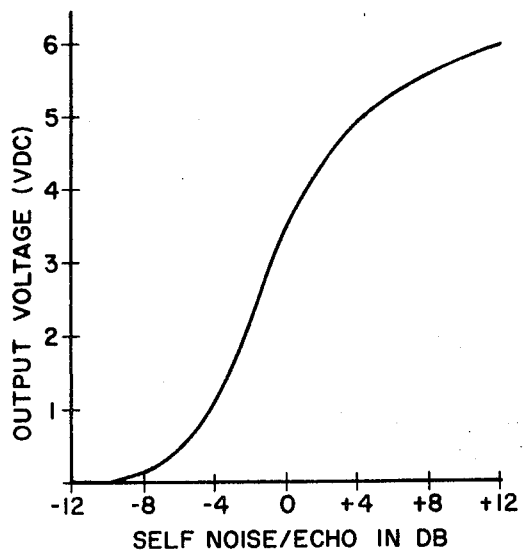
FIG. 4 is a graphical representation of the output voltmeter reading vs self-noise/target-signal ratio for signals detected by the hydrophone.
Figure 5:
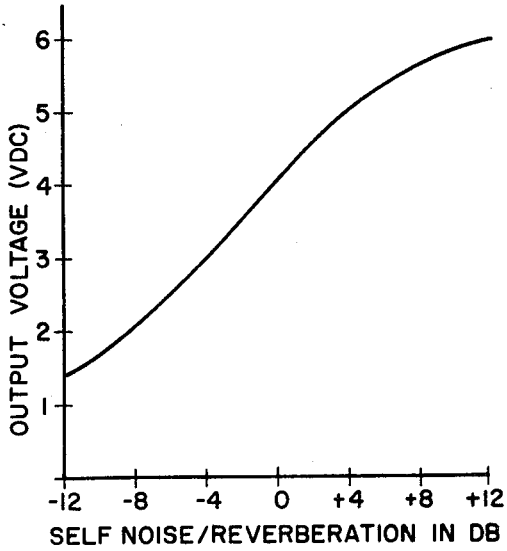
FIG. 5 is a graphical representation of the output voltmeter reading vs self-noise/reverberation ratio for signals detected by the hydrophone.

In using this embodiment in a passive acoustic torpedo as previously described, reverberation is absent and the curve of FIG. 4 could be used to determine the self-noise/target-signal ratio from the reading of voltmeter 20. In such a system the "echo" may be regarded as a pure tone emitted by the target vessel. Likewise, the curve of FIG. 5 relates to operation of an active acoustic torpedo system in the time interval after the torpedo has emitted an acoustic search pulse but before the echo has returned. The curve of FIG. 4 is also applicable in the interval after the reverberation from the acoustic search pulse has decayed to a negligible quantity and when the echo from the target vessel is being received by the hydrophones. In each case, by knowing the particular characteristics of the time interval, it is merely necessary to read the voltmeter 20 reading on the ordinate, transpose this reading to the abscissa via the curve. For example, on FIG. 5, a voltmeter reading of 5 volts would indicate a self-noise/reverberation ratio of +4 db.

Although the invention has been described with reference to a particular embodiment, it is to be understood that the said embodiment has been given by way of example only and that numerous changes in details, construction, and combination and arrangements of parts may be resorted to without departing from the spirit and scope of the invention as defined in the following claims.

What is claimed is:

1. In a marine torpedo adapted to receive acoustic signals from a target and to home upon these signals, the combination comprising:

a hydrophone adapted to detect acoustic signals from an aquatic environment;

a hard-limiter circuit connected to the output of said hydrophone to produce a pulse of changing polarity when the signal output from said hydrophone changes polarity;

a blocking oscillator multi-vibrator circuit connected to the output of said limiter and adapted to produce a short pulse of fixed duration and energy when the signal from said limiter circuit changes polarity in preselected sense;

a bandpass filter circuit connected to the output of said limiter circuit tuned to allow the passage of a discrete band of frequencies;

an amplifier circuit connected to the output of said filter circuit;

a rectifier circuit connected to the output of said amplifier circuit;

a voltage measuring means connected to the output of said rectifier circuit whereby the quality of acoustical signal impinging upon said hydrophone can be determined by reference to said voltage measuring means.

2. An apparatus for use in underwater active-acoustic echo-ranging systems to provide a measure of the variable ratio of self-noise to reverberation signals during listening intervals between successive search-pulse transmission instants, said apparatus comprising, in combination:

hydrophone means for reception of target-echo signals in a background of reverberation and self-noise signals;

a limiter circuit for conversion of said signals to a rectangular-waveform signal having the same zero-axis crossing characteristics as the signal received by said hydrophone means;

multi-vibrator means adapted to provide, in response to triggering action of said rectangular-waveform signal whenever it changes polarity in preselected sense, a train of short pulses of fixed duration and amplitude;

said train of pulses presenting a frequency-variational characteristic evidenced by an A.C. ripple signal which in a predetermined frequency band is of magnitude increasing with self-noise/reverberation signal ratio;

means including a band-pass filter for passing only said predetermined frequency band of A.C. ripple signal; and means responsive to said A.C. ripple signal in said predetermined frequency band to provide a measure of said self-noise/reverberation signal ratio.

* * * * *